United States Patent
De Schrijver et al.

(10) Patent No.: US 9,796,808 B2
(45) Date of Patent: Oct. 24, 2017

(54) COMPOSITION FOR ONE-COMPONENT POLYURETHANE FOAMS HAVING LOW FREE MONOMERIC MDI CONTENT

(75) Inventors: Aster De Schrijver, Deurle (BE); Joao Moura Bordado, Lisbon (PT); Georgi Georigev, Sofia (BG)

(73) Assignee: Aster De Schrijver, Deurle (BE)

( * ) Notice: Subject to any disclaimer, the term of this patent is extended or adjusted under 35 U.S.C. 154(b) by 774 days.

(21) Appl. No.: 13/981,303

(22) PCT Filed: Jan. 26, 2012

(86) PCT No.: PCT/EP2012/051245
§ 371 (c)(1),
(2), (4) Date: Nov. 4, 2013

(87) PCT Pub. No.: WO2012/101220
PCT Pub. Date: Aug. 2, 2012

(65) Prior Publication Data
US 2014/0288201 A1    Sep. 25, 2014

(30) Foreign Application Priority Data
Jan. 27, 2011   (EP) .................................... 11152422

(51) Int. Cl.
C08G 18/08 (2006.01)
C08G 18/10 (2006.01)
C08G 18/76 (2006.01)
C08K 5/521 (2006.01)
C08G 101/00 (2006.01)

(52) U.S. Cl.
CPC ......... *C08G 18/7671* (2013.01); *C08G 18/10* (2013.01); *C08G 18/14* (2013.01); *C08G 18/7621* (2013.01); *C08G 18/7664* (2013.01); *C08K 5/521* (2013.01); *C08G 2101/00* (2013.01); *C08G 2190/00* (2013.01)

(58) Field of Classification Search
CPC ..................................................... C08G 18/14
USPC ........................................................ 521/159
See application file for complete search history.

(56) References Cited

U.S. PATENT DOCUMENTS

| | | | |
|---|---|---|---|
| 3,830,760 A | 8/1974 | Bengtson | |
| 4,258,140 A | 3/1981 | Horacek et al. | |
| 4,508,853 A | 4/1985 | Kluth et al. | |
| 4,742,087 A | 5/1988 | Kluth et al. | |
| 4,980,397 A * | 12/1990 | Rao | C09D 5/443 204/501 |
| 5,075,407 A | 12/1991 | Cody et al. | |
| 5,631,319 A | 5/1997 | Reese et al. | |
| 5,786,402 A | 7/1998 | Bruchmann et al. | |
| 5,817,860 A | 10/1998 | Rizk et al. | |
| 6,090,307 A | 7/2000 | Forster et al. | |
| 6,396,188 B1 | 5/2002 | Kliman et al. | |
| 6,410,609 B1 | 6/2002 | Taylor et al. | |
| 6,673,415 B1 * | 1/2004 | Yamazaki | B32B 3/12 428/117 |
| 7,776,934 B2 | 8/2010 | Lekovic et al. | |
| 2007/0027051 A1 | 2/2007 | Staudigel et al. | |
| 2009/0253819 A1 | 10/2009 | Reese et al. | |
| 2012/0216952 A1 * | 8/2012 | Bushendorf | C08G 18/10 156/331.4 |

FOREIGN PATENT DOCUMENTS

| | | | |
|---|---|---|---|
| DE | 102 16 659 | 10/2003 | |
| DE | 103 11 607 | 9/2004 | |
| DE | 10 2008 034 272 | 1/2010 | |
| EP | 0 480 342 | 4/1992 | |
| EP | 1 518 874 | 3/2005 | |
| EP | 1 674 492 | 6/2006 | |
| FR | 2 396 035 | 1/1979 | |
| GB | 0 962 951 | 7/1964 | |
| PT | WO 2007068480 A2 * | 6/2007 | ............. C08G 18/10 |
| WO | WO 00/04069 | 1/2000 | |
| WO | WO 02/079291 | 10/2002 | |
| WO | WO 02/090410 | 11/2002 | |
| WO | WO 03/022901 | 3/2003 | |
| WO | WO 2005/007721 | 1/2005 | |
| WO | WO 2006/042305 | 4/2006 | |
| WO | WO 2007/100502 | 9/2007 | |
| WO | WO 2009/144280 | 12/2009 | |

* cited by examiner

*Primary Examiner* — Melissa Rioja
(74) *Attorney, Agent, or Firm* — Levy & Grandinetti

(57) ABSTRACT

A one component precursor for the polymeric foam (OCF) composition comprising a very low amount of free monomeric MDI. The present OCF composition may be obtained without any free MDI removal step, and without the addition of extra solvent to compensate for the substantially lower amount of free MDI, compared with traditional compositions. The present composition comprises a source of free NCO of functionality of at least 2.6, a tri- or higher functional alcohol, all polyols being characterized by a rather low molecular weight and at least a specific mono-functional alcohol as well as an isocyanate end-capped prepolymer of toluene diisocyanate (=end capped TDI). The OCF composition is suitable for being dispensed from a pressurized can with a blowing agent.

17 Claims, 3 Drawing Sheets

COMPOSITION FOR ONE-COMPONENT POLYURETHANE FOAMS HAVING LOW FREE MONOMERIC MDI CONTENT

TECHNICAL FIELD

The present invention relates to a pressurized one component polyurethane precursor composition reacting with moisture to produce a polyurethane product, in particular polyurethane fomas, said composition comprising a very low amount of free monomeric diphenyl methane diisocyanate (MDI), preferably, lower than 1 wt. % free monomeric MDI.

BACKGROUND FOR THE INVENTION

Polyurethane products, such as polyurethane foams, are produced by the reaction of a polyol and a polyisocyanate, in the presence of a catalyst and additives such as a flame retardant, a surfactant, pigments, dye, fillers, or other components. For foams, the use of a blowing agent is required. By varying the type and amount of reactants and optional additives, a wide variety of polymers and foams can be produced having different densities, rigidity, and structures.

The metering and mixing of two components (polyol and polyisocyanate) to produce a polyurethane product (referred to for foams as two components foams or TCF) being unpractical in many applications, one component polyurethane precursors (referred to for foams as one component foams or OCF) were developed, wherein a prepolymer containing isocyanate groups is filled into a pressure vessel. OCF's are sold in pressurized cans containing said prepolymer containing isocyanate groups together with one or more blowing agents and conventional additives. A polyurethane foam can then be produced by simply spraying the content of the pressure vessel, which will form a cellular structure under the action of the blowing agent and cure under the action of the ambient moisture. OCF's are of course much easier to use then TCF's since they require no metering, no mixing of the foam components and are currently used in e.g., the building sector, for example, for filling, insulating or fastening doors, windows and the like, and in the automotive industry, for vibration and sound dampening.

The literature disclosing one component foam compositions is abundant and the following patents can be cited as example only: EP480342; EP1674492; DE102008034272; FR2396035; GB962951; U.S. Pat. Nos. 3,830,760; 4,258,140; 4,508,853; 4,742,087; 5,817,860; 5,075,407; 5,786,402; 6,410,609; ; US200727051; WO02090410; WO02079291; U.S. Pat. Nos. 6,090,307; 5,631,319; US2007/0197672; WO00/04069; WO02/090410; WO2005/007721; WO2007/100502.

A typical polyisocyanate component present in most OCF compositions is diphenylmethane diisocyanate (MDI) or a mixture of diphenylmethane diisocyanate and poly-(phenylene methane poly-isocyanate), often referred to as crude MDI, which provides a convenient source of free NCO-groups to react with the polyols. The polyols used are usually a mixture of bi-, tri-, and sometimes higher functional polyols of rather high molecular weight, which react with MDI to form NCO-containing prepolymers. Each prepolymeric chain contains a limited number of free NCO-groups, of the order of 2 or 3 per chain, yielding a free NCO-group content of about 6-7% for rigid foams, and lower for more flexible chains. It is well established, however, that the optimal content of free NCO-groups to obtain a satisfactory crosslinking density is around 14.5% or more.

In order to reach the required proportion of free NCO-groups, most compositions comprise an excess amount of free MDI. The excess content of MDI in the mixture is further encouraged by the fact that MDI is a good solvent for NCO-containing prepolymers, which need be dissolved lest the viscosity of the mixture would be too high to allow its spraying out of the can. Furthermore, MDI shows excellent compatibility with the blowing agents (or propellent) generally used.

Free monomeric MDI, however, is highly toxic and the great ease of use associated with OCF formulations is severely outweighed by the care the end-user must show to protect itself from breathing free MDI present in the foaming mixture as it is being dispensed. This is rendered even more critical by the fact that OCF's are often used to fill in cavities which are poorly ventilated and thus exposing the user to great risks.

To solve this problem, DE10311607 proposes to react polyols with a stoechiometric excess of a monomer-free polyisocyanate and then to remove the excess di-isocyanate. Although quite effective, this solution requires an extra step for removing the excess di-isocyanate and an additional thinning agent, dimethyl ether, must be added to reduce the viscosity of the mixture.

Similarly, EP1518874 discloses an OCF composition having a low monomer content, which is obtained from a specific mixture of poly-(phenylene methane poly-isocyanates) (PMDI), and comprising removal of the monomeric isocyanate by distillation.

US2009253819 discloses an OCF composition having a low content of monomeric MDI obtained by reacting a specific mixture of MDI and polymeric MDI having an average functionality of from 2.2 to 5.2. But the preparation of the specific mixture requires the extraction of mixtures of diisocyanates and polyisocyanates having an average functionality of greater than 2 and then freeing them from diisocyanates by distillation, which basically does not remove, but simply shifts the distillation step upstream of the process, compared with the previous disclosures.

WO 2005/007721 discloses an OCF composition having a low content of free MDI, obtained by the use of mixtures of NCO-terminated prepolymers obtained by reaction of polyols and diphenylmethane diisocyanate in stoechiometric excess which had been freed from monomers, and a number of polymeric MDI and diluents. Disadvantageous here are the extremely high viscosities of the starting materials in the absence of diluting monomeric MDI.

It can be seen from this review of the prior art, that it remains a need in the art for a polyurethane composition having a low content of free monomeric MDI, which preparation does not require any monomeric MDI removal step nor the use of additional solvents to compensate for the low amount of monomeric MDI. At the same time, the composition viscosity should be sufficiently low to allow spraying thereof out of a pressurized can, and the NCO content should be sufficiently high to allow a sufficient degree of polymerization to yield the desired properties.

These and other objects of this invention will be evident when viewed in light of the drawings, detailed description, and appended claims.

SUMMARY OF THE INVENTION

The present invention is defined in the appended independent claims. Preferred embodiments are defined in the dependent claims.

In particular, the present invention concerns a one component isocyanate prepolymer mixture for the production of a polyurethane product, said mixture having a content of free monomeric diphenylmethane diisocyanate (MDI) of not more than 4 wt %, preferably not more than 3 wt. %, more preferably nor more than 2 wt. %, most preferably, not more than 1 wt % with respect to the total weight of the mixture, and being obtained by mixing in the absence of moisture at least;
  (a) an isocyanate component, or mixture of isocyanate components, having a functionality of at least 2.6, preferably comprising crude MDI,
  (b) a tri- or higher functional polyol;
  (c) a catalyst and optional additives;
characterized in that, it further comprises the components (a)&(b) of the kit of parts defined supra.

The mixture of isocyanate components preferably comprises crude diphenyl methane diisocyanate (crude MDI). It may also comprise in replacement or additionally any one or more of diphenyl methane diisocyanate (MDI), toluene diisocyanate (TDI), crude toluene diisocyanate (crude TDI), poly-phenyl methane poly-isocyanate, (PMDI), and any mixture thereof having a functionality of at least 2.6.

The tri- or higher functional polyol preferably has a molecular weight of not more than 2000, preferably, not more than 1000. For example, it may comprise one or more of
  (i) an ester with three or more esterified hydroxy functional fatty acid groups, wherein the closest hydroxyl group on each hydrocarbon chain is separated from the respective ester group by at least seven carbons; and
  (ii) a hydroxy functional polyether oligomer having an overall hydroxy functionality comprised between 3 and 8, and is preferably a poly(hydroxy poly-alkyloxy alkyl)etherified polyol;

The esterified hydroxy functional fatty acid chains defined above can be any of the group of: ricinoleic acid, avenoleic acid, strophantus acid, lesquerolic acid, 14-hydroxy-11-eicosenoic acid, densipolic acid, and auricolic acid.

It is advantageous to provide in the mixture of the present invention a bi-functional alcohol having a molecular weight not greater than 400 g/mol and preferably not greater than 110 g/mol. Said bi-functional alcohol is preferably selected from the group of: monoethylene glycol (MEG), diethylene glycol (DEG), propylene glycol, 1,3-propylene glycol, 1,3-butane diol, 1,4-butane diol, neopentyl glycol, vegetable origin monoglicerides, and mixtures thereof, and wherein said mixture preferably does not contain any polypropylene glycol (PPG).

In case of one component foam precursors, the mixture of the present invention shall further comprise a blowing agent. Suitable blowing agents can be selected from the group of propane, butane, i-butane, dimethyl ether (DME), carbon dioxide ($CO_2$), and mixtures thereof and is preferably present in an amount of 50 to 70 vol %, more preferably 55 to 65 vol %.

The additives suitable for the mixture of the present invention can be one or more of:
  a flame retardant selected from the group of: monochlorinated mono-methyl ester of castor oil, or (1-chlor-2-propyl) phosphate (TCPP),
  a catalyst selected from: the group of Lewis bases or acids, dimethyl aminoethoxyethanol (DMEE), di-morpholino diethyl ether (DMDEE), or mixtures thereof,
  a surfactant and/or cell structure regulator, preferably silicone surfactants or paraffin, and
  a filler, a pigment, or dye.

In order to ensure a low free monomeric MDI content, the NCO/OH ratio in the initial blend is preferably between 2.6 and 5.0, more preferably between 2.6 and 4.0, or even between 2.9 and 3.5, and most preferably between 3.0 and 3.3.

A typical mixture according to the present invention comprises:
  (a) between 15 and 25 wt % of MDI or PMDI prepolymers and 20 to 75 wt %, preferably berween 30 and 50 wt. % of isocyanate end-capped TDI,
  (b) between 5 and 15 wt % of a mono-functional alcohol, preferably 2-ethyl-hexanol, more preferably between 8 and 12 wt %, most preferably between 9.5 and 10.5 wt %;
  (c) between 0 and 15 wt % of a bi-functional alcohol, preferably ethylene glycol, more preferably between 2 and 8 wt %;
  (d) between 8 and 20 wt % of castor oil, preferably between 10 and 15 wt %, more preferably between 10.5 and 12.0 wt %
all weight fractions being calculated with respect to the total weight of the mixture.

The present invention also concerns a method for preparing a one component isocyanate prepolymer mixture for the production of polyurethane, said mixture having a content of free monomeric diphenylmethane diisocyanate (MDI) of not more than 4 wt. % with respect to the total weight, said method comprising loading in a closed, hermetic vessel protected from moisture and mix appropriate amounts of a mixture comprising:
  (a) an isocyanate component, or mixture of components, having a functionality of at least 2.6;
  (b) a tri- or higher functional polyol
  (c) a catalyst and additives;
  (d) an isocyanate end-capped prepolymer of toluene diisocyanate (=end capped TDI), and
  (e) a mono-functional alcohol having a molecular weight of at least about 130 g/mol, preferably having a branched paraffinic structure for controlling the flexibility of the final foam;

If a one component polyurethane foam precursor is produced the method comprises the following additional steps:
  optionally transfer the mixture thus obtained into a dispensing container, shielding the blend from moisture;
  hermetically close the vessel or dispensing container containing the mixture and
  introduce therein a blowing agent under pressure through a valve.

The present invention also concerns the use of a composition for the reduction of free monomeric diphenylmethane diisocyanate (MDI) in one component polyurethane precursor mixtures, wherein said compositions comprises:
  (a) a mono-functional alcohol having a molecular weight of at least about 130 g/mol, preferably having a branched paraffinic structure, and
  (b) an isocyanate end-capped prepolymer of toluene diisocyanate (=end capped TDI).

A particularly preferred composition for reducing the free monomeric MDI in a one component polyurethane precursor mixture is obtained by combining the components of a kit of parts comprising:
  (a) a mono-functional alcohol having a molecular weight of at least about 130 g/mol, selected from 2-ethyl-hexanol, ester of vegetal oil containing one secondary hydroxyl group, such as ricinoleic ester group, or mixtures thereof, and (b) an isocyanate end-capped prepolymer of toluene diisocyanate (=end capped TDI).

Preferably, the end-capped TDI is the reaction product of TDI with a diol or a triol, wherein the diol or triol is preferably a polyether type alcohol with propoxy chains starting with a glycerin skeleton.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

An important issue for polyurethane compositions and OCF compositions in particular is the viscosity of the prepolymerized mixture in the pressurized vessel. For this reason, as reviewed in the background art, free monomeric MDI is often used in relatively large quantities, because it is both a convenient source of free NCO-groups and a good solvent for the free NCO-containing prepolymers. Reducing the amount of free monomeric MDI by simply replacing it by an alternative polyisocyanate could therefore possibly provide an alternative source of free NCO-groups, but would yield a mixture having a viscosity too high to be dispensed from a pressurized vessel, such as an aerosol can. This explains why, the solutions proposed in the prior art to reduce the amount of free monomeric MDI involve using an excess MDI, followed by removing the remaining free monomeric MDI, e.g., by distillation, and introduction of another solvent, e.g., methyl dimethyl ether, to compensate for the removed MDI.

The present invention distinguishes itself completely from this complex route to reduce the amount of free monomeric MDI present in the OCF mixture to less than 4 wt. %, preferably less than 3.0 wt. %, more preferably less than 2.0 wt. %, most preferably less than 1 wt. %. Indeed, according to the present invention, no free monomeric MDI removal step is required, and the absence of free monomeric MDI needs not be compensated by an additional amount of an alternative solvent. All these objects were rendered possible by mixing a state of the art composition comprising polyisocyanates of average functionality greater than 2.6, preferably comprising crude MDI, and tri- or higher functional alcohols with a specific combination of a monofunctional polyol and isocyanate end capped prepolymer of toluene diisocyanate (=end-capped TDI). With such mixture the amount of free monomeric MDI can be reduced substantially to below 4 wt. %, and even down to below 1 wt. % with respect to the total weight of mixture.

The polyols used preferably have a rather low molecular weight, in contrast with the prior art compositions which usually comprise high molecular weight polyols, like polypropylene glycol (PPG). It is preferred in the present invention, that the mixture comprises no high molecular weight polymers like PPG. In order to better understand the present invention, the polymerization mechanism of a one component polyurethane prepolymer such as a polyurethane foam is reviewed briefly.

Figure 1:
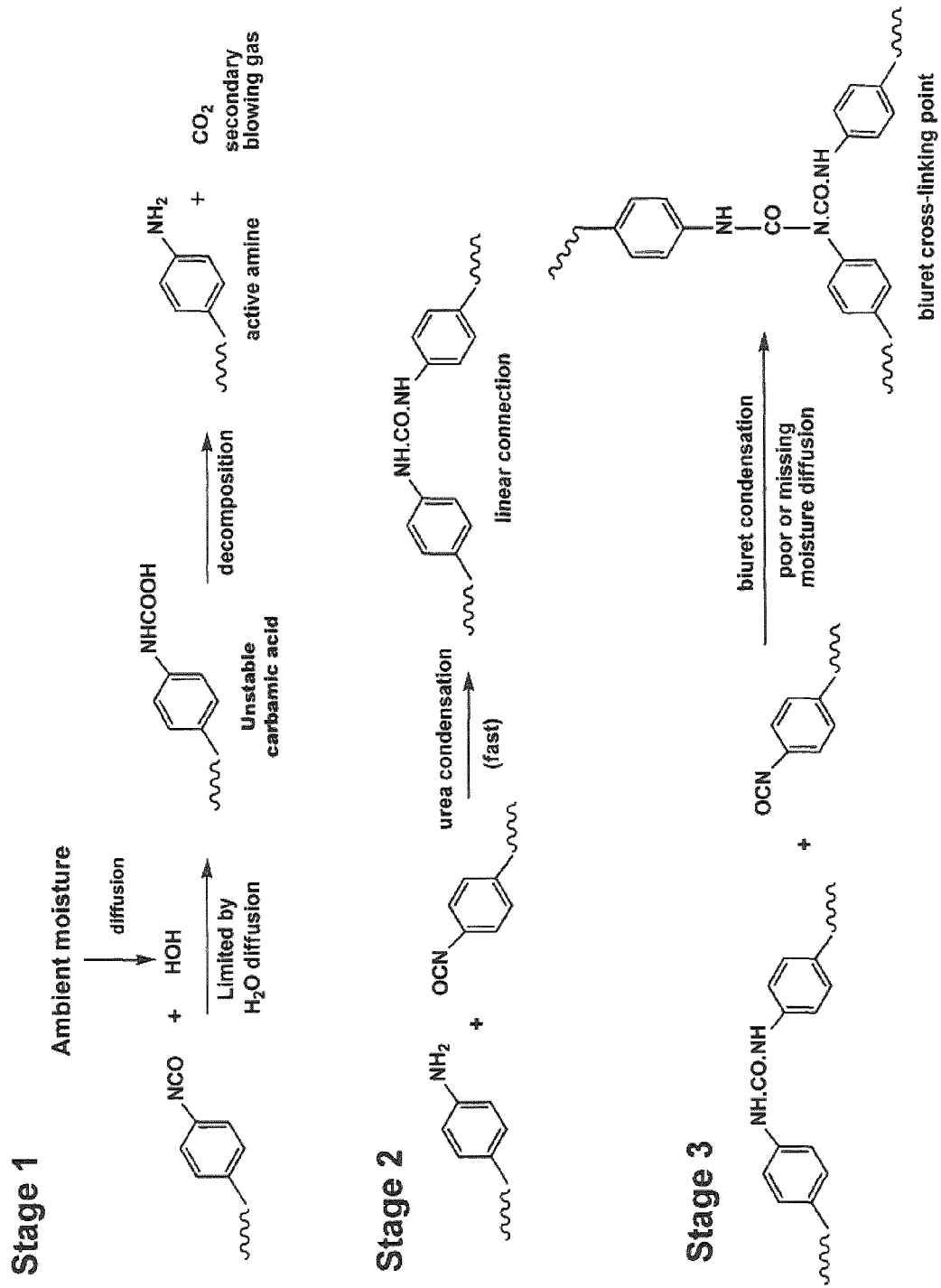
FIG. 1: schematically shows the three main stages occurring during foam formation upon contacting an OCF mixture with ambient moisture.

FIG. 1 shows the three main reaction stages responsible for the formation of a polyurethane foam upon contacting an OCF composition with moisture:

stage 1 Formation of active $NH_2$-groups able to condensate with NCO-groups and releasing secondary blowing gas, $CO_2$.

stage 2 Formation of urea by condensation between $NH_2$-groups, formed in Stage 1, and free NCO groups:

stage 3 Biuret condensation between urea group, formed in Stage 2, and free NCO groups.

Stage 1:

Upon dispensing an OCF composition in the ambient, the free NCO groups of the prepolymers react in a first stage with ambient moisture to form unstable carbamic acid, which readily decomposes into an active amine and gaseous $CO_2$. At an initial stage, as free NCO is readily contacted by moisture from ambient, this reaction is very fast, but as the reaction progresses, the reaction rate decreases as it becomes controlled by the diffusion of the moisture through the forming foam to reach the remaining free NCO-groups. One way of controlling the rate of stage 1 reaction is to control the hydrophilicity/hydrophobicity of the mixture, the reaction rate increasing with higher hydrophilicity. For example, for a given content of about 15% of free NCO groups attached to a polyether polyol, the hydrophilicity/hydrophobicity of the prepolymer can be increased by increasing/decreasing the number of alkoxy-groups in the polyether chains. Of course, removing alkoxy groups altogether, such as by using paraffinic chains, will confer a quite hydrophobic character to the mixture.

Stage 2:

In a second stage, urea is formed by condensation between NH2-groups, formed in Stage 1, and unreacted NCO groups. Here again, the reaction is very fast if sufficient NH2-groups can readily contact free NCO-groups but, on the one hand, it is strongly dependent on the NH2-groups formation rate in stage 1 and, on the other hand, it becomes diffusion controlled as the viscosity of the froth increases. With di-isocyanates, like MDI, this reaction yields linear structures, but with tri- and higher functionality isocyanates it yields a three-dimensional cross-linked urethane net. Since a certain amount of di-isocyanates is likely to be present in most OCF formulations, yielding linear structures, this type of cross-linking reactions can be defined as yielding a soft crosslink, and becomes harder as the fraction of di-isocyanate present in the polyisocyanate decreases.

Stage 3:

The third stage involves biuret condensation between urea groups formed in the second stage and free NCO-groups, yielding so-called biuret type cross-links. At the early stages of the reaction, and if moisture can readily access to free NCO-groups, biuret condensation rate is insignificant compared with stages 1 and 2 but, as the viscosity of the froth increases, the reaction rates of stages 1 and 2 decrease and biuret reactions may become predominant. Because biuret condensation becomes relevant only at a later stage, when a three-dimensional net is already formed to varying extents and the viscosity has grown considerably, the reaction rate is diffusion controlled, and only the most mobile and shortest chains containing free NCO-groups, in particular free monomeric MDI, are able to diffuse and react with prepolymers. This hardens the foam and biuret condensation can thus be defined as yielding hard crosslink.

Generally speaking, flexible foams can be obtained for example by promoting stages 1 and 2, so that biuret condensation happens only later to fix the cells thus formed. On the other hand, rigid foams can be obtained by e.g., hindering stages 1 and 2, for example with hydrophobic groups, so that the third stage starts earlier and forms a hard structure.

The OCF compositions of the present invention are comparable with any OCF composition on the market in their viscosity, and in that they have a free NCO-groups content in the pressurized vessel of at least 14.5%. Typical compositions according to the present invention distinguish themselves from most known compositions, however, inter alia in that:

They have a low content of free monomeric MDI (≤4 wt. %, preferably, ≤1 wt. %);

They have undergone no extraction stage of free monomeric MDI;

They comprise no extra solvent to compensate for the lower amount of free monomeric MDI; furthermore The index NCO/OH in the initial blend is of the order of 2.6 to 5.0, preferably 2.6 to 4.0, more preferably 2.9 to 3.5, or even between 3.0 and 3.3 whilst traditional OCF compositions generally have an index of at least 4.8; and They contain no long chains of di-functional alcohols, such as PPG; nor of tri- and higher functional alcohols, to both decrease the viscosity and increase the ratio of free NCO-groups attached to a prepolymer to free monomeric MDI (free MDI 4 wt. %, and down to ≤1 wt. %);

They comprise isocyanate end-capped prepolymers of TDI, and

They comprise mono-alcohols of molecular weight of at least 130 g/mol.

Surprisingly, and contrary to what could be expected, such compositions do not yield foams excessively brittle by using a sufficiently long hydrophobic mono-functional alcohol (Mw≥130 g/mol), such as 2-ethyl-hexanol, an ester of vegetal oil containing one secondary hydroxyl group, such as ricinoleic ester, and mixtures thereof. The mono-functional alcohol in the present invention acts to soften the foam.

Figure 2:
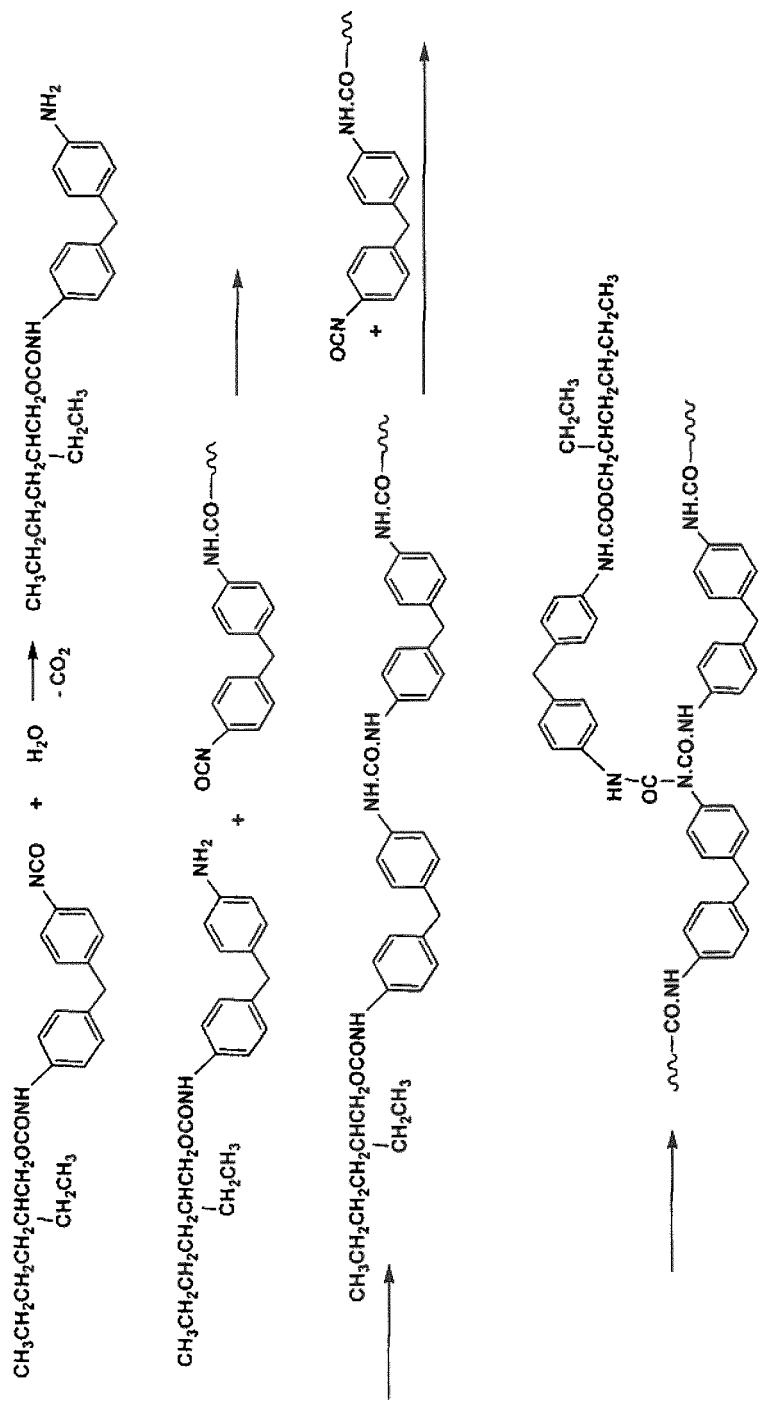
FIG. 2: schematically shows how the monofunctional alcohol reacts with PMDI.

As illustrated in FIG. 2 with 2-ethyl-hexanol, the mono-functional alcohol reacts with polyisocyanate (MDI in FIG. 2) to form long flexible chains. This applies in particular to stage 3 of the foam polymerization as biuret condensation predominantly occurs with the prepolymers of the mono-functional alcohols, as they are more mobile than three dimensionally crosslinked structures. By controlling the balance between stages 2 and 3, foams with a wide variety of degrees of flexibility/rigidity can thus be designed.

As illustrated in FIG. 2 with 2-ethyl-hexanol, THIS mono-functional alcohol reacts in the closed can with polyisocyanate (MDI in FIG. 2) to form mono-functional NCO end-capped prepolymers. When sprayed out of the can, said mono-functional NCO-prepolymer will react further to form lateral branches, which are much more flexible than short crosslinked bridges formed by reaction with MDI. These lateral branches formed in a foam according to the present invention replace crosslinking points formed with MDI in the prior art foams. Since the resulting structure with branches is more flexible than a fully crosslinked foam, long chain polyols (diols, triols, and higher alcohols, such as PPG) need not be as long as in prior art mixtures, which has the further advantage to reduce viscosity without increasing brittleness. Alternative mono-functional alcohols that can be used in the present invention are fatty alcohols, such as oleyl aclohol, or mono-functional alcohol oligomers, including the ones with triglyceride structures, or mixtures thereof. But the preferred mono-functional aclohols are 2-ethyl-hexanol, ester of vegetal oil containing one secondary hydroxyl group, such as ricinoleic ester, and mixtures thereof.

Isocyanate end-capped TDI prepolymers are obtained by reacting multi-functional alcohol with TDI. In particular, diols or triols obtained by reacting a polyether chain, such as oxy-propylene (OP), oxy-ethylene (OE), and the like with a polyol such as glycerine, trimethyl propane (TMP), a glycol such as MEG or MPG, and the like. The resulting polyol should have a Mw comprised between 400 and 5000 g/mol, preferably between 700 and 4000 g/mol, more preferably between 1000 and 3000 g/mol. Such end-capped TDI prepolymer is referred herein as follows: polyether type/polyol Mw, such as for example, OP/glycerine 2000, EP/TMP 3000.

The compositions of the present invention are obtained by mixing and reacting free of moisture polyisocyanates, alcohols, catalyst, additives, and a kit of parts comprising a mono-functional alcohol having a molecular weight of at least about 130 g/mol, preferably having a branched paraffinic structure, and an isocyanate end-capped prepolymer of toluene diisocyanate (=end capped TDI) to form prepolymers containing free NCO-groups. For OCF's, a blowing agent is required to create a cellular structure, The polyisocyanates used must have a functionality of at least 2.6 to yield the desired properties of an OCF. Beside isocyanate end-capped prepolymers of TDI, a single isocyanate component may be used, but it is generally preferred to have a mixture of various di-, tri-, and higher functional isocyanates. In particular, the following polyisocyanates may be used: monomeric or crude MDI, crude toluene diisocyanate (crude TDI), poly-phenyl methane poly-isocyanate, (PMDI), and any mixture thereof having a functionality of at least 2.6. Crude MDI and end-capped TDI are preferably present in an amount such that, after reaction with the alcohols, not more than 4 wt. %, preferably, not more than 1 wt. % free monomeric MDI with respect to the total weight of the mixture, remains unreacted. Preferably, crude MDI and the polyols should be present in amounts such that the number of OH group of the polyols matches the number of NCO groups from the crude MDI.

Figure 3:
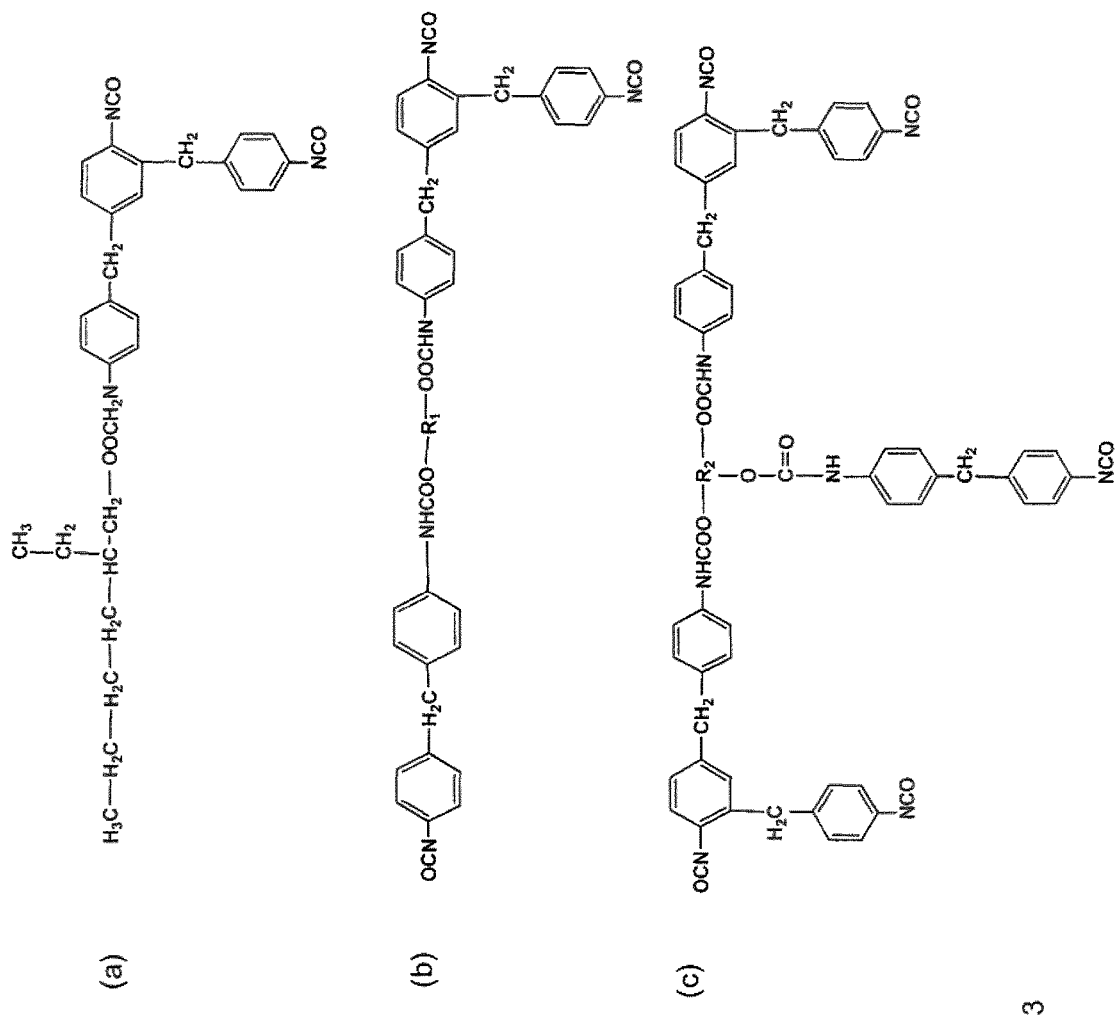
FIG. 3 shows embodiments of NCO prepolymers obtained by reaction of NCO-groups with (a) mono-functional, (b) bi-functional, and (c) tri-functional alcohols.

As discussed supra with respect to FIG. 2, the monofunctional alcohol of molecular weight of at least 130 g/mol and, more particularly, the prepolymers obtained from the reaction between said alcohol and free NCO, allows to soften the crosslinked net of the OCF, in particular by biuret condensation (stage 3) and thus to control the rigidity of the final foam. A most preferred monofunctional alcohol is 2-ethylhexanol, and excellent results were obtained also with esters of vegetal oil containing one secondary hydroxyl group, such as ricinoleic ester. Other monofunctional alcohols may be used alone or admixed with one or the other of the above polyols. An example of bifunctional NCO-prepolymer obtained from a monofunctional alcohol is illustrated in FIG. 3(*a*).

Whilst the monofunctional alcohol according to the present invention needs be long enough (Mw≥130 g/mol) to soften the crosslinked net, the polyols must be shorter to yield a higher amount of free NCO-groups attached to a prepolymer, and to reduce the viscosity. The mixture of the present application may further be controlled by mixing a bi-functional alcohol with the other components. Suitable bi-functional alcohols shall have a molecular weight not exceeding about 110 g/mol. It acts as an extender and permits to control the rigidity of the final foam. Examples of bi-functional alcohols suitable for the present invention are monoethylene glycol (MEG), diethylene glycol (DEG), propylene glycol, 1,3-propylene glycol, 1,3-butane diol, 1,4-butane diol, neopentyl glycol, fatty acid monoglicerides, and mixtures thereof. An example of tri-functional NCO prepolymer obtained from reaction of a bi-functional alcohol is illustrated in FIG. 3(b).

As mentioned supra, the tri- or higher functional polyols should be sufficiently short to maintain the viscosity low enough for dispensing. Preferably, the tri- or higher functional polyols should have a molecular weight of not more than 2000 g/mol, preferably, not more than 1000 g/mol. For example, suitable polyols can be selected from:

(i) an ester with three or more esterified hydroxy functional fatty acid groups, wherein the closest hydroxyl group on each hydrocarbon chain is separated from the respective ester group by at least seven carbons; and (ii) a hydroxy functional polyether oligomer having an overall hydroxy functionality comprised between 3 and 8.

Particularly preferred esters with three or more esterified hydroxy functional fatty acid groups can be esters of ricinoleic acid, avenoleic acid, strophantus acid, lesquerolic acid, 14-hydroxy-11-eicosenoic acid, densipolic acid, and auricolic acid. A most preferred ester is ricin oil. Preferred polyether oligomers are hydroxyl polyoxypropylene glycerides, such as tris-[hydroxy-tetra (1,2 oxypropylenyl)-1,2 propyl]glyceryl ether, or tris-[hydroxy-penta (1,2 oxypropylenyl)-1,2 propyl]glyceryl ether.

The functional polyether oligomers suitable for the present invention preferably have flexible chains. The flexibility of a chain expresses the ease of mutual free rotation of atoms forming the skeleton of a chain with respect to the neighbouring atoms of the chain, wherein the rotation axes, angles, and amplitude depend on the valences of the neighbouring atoms, on the bonds lengths, steric effects, and the like. The flexibility of polyether polyols' chains may differ substantially depending on their nature. Ethylene oxide type polyether polyols have rather flexible chains, with short and easily movable segments, resulting in a high propensity to crystallize. On the other hand, propylene oxide type have somewhat "harder" chains, with longer segments which are more difficult to move; these chains are more difficult to crystallize than the former. In the context of the present invention, a polyether oligomer with "flexible" chain is therefore meant to refer to a substantially linear chain, comprising few stiffening elements such as unsaturated double bonds, bulky groups like phenolic rings, and the like.

An example of composition in polyisocyanate and alcohols of a mixture according to the present invention comprises:

(a) between 15 and 25 wt % of MDI or PMDI prepolymers and 20 to 75 wt %, preferably berween 30 and 50 wt. % of isocyanate end-capped TDI, (b) between 5 and 15 wt % of a mono-functional alcohol, preferably 2-ethyl-hexanol, more preferably between 8 and 12 wt %, most preferably between 9.5 and 10.5 wt %;

(c) between 0 and 15 wt % of a bi-functional alcohol, preferably ethylene glycol, more preferably between 2 and 8 wt %;

(d) between 8 and 20 wt % of castor oil, preferably between 10 and 15 wt %, more preferably between 10.5 and 12.0 wt % all weight fractions being calculated with respect to the total weight of the mixture.

In a preferred embodiment, the weight ratio of the mono-functional alcohol, preferably 2-ethyl-hexanol, to castor oil is greater than 25%, preferably greater than 30%, more preferably greater than 45%, most preferably greater than 70%. If 2-ethyl-hexanol is used, its weight ratio to the total weight of polyols is preferably greater than 20%, more preferably greater than 24%, most preferably greater than 30%.

At an early stage of the reaction, the prepolymers obtained by reaction of NCO-groups with polyols (such as bi-, tri-, and higher functionality alcohols) will react and form at stage 2 a rather dense crosslinking network due to the short chains of the prepolymers. This early fixing of the prepolymers obtained from polyols excludes them from participating actively to biuret crosslinking other than as targets. Only the low molecular weight prepolymers may diffuse and react by biuret condensation, so that the prepolymers of monofunctional alcohols, with their higher mobility, will predominantly participate in stage 3 of the crosslinking. With their substantially linear structure, the latter prepolymers confer a certain flexibility to the foam during the biuret condensation, which is contrary to what is observed with traditional foam compositions. The degree of flexibility can further be controlled by dosing appropriately the amount of di-isocyanate which will yield by reaction with monofunctional alcohols, monofunctional NCO prepolymers, which limit the degree of branching occurring with biuret condensation. It can be seen that by controlling the kinetics of stages 2 and 3 of the foam crosslinking reaction, as well as by the choice of components and their amounts, the properties of the foams thus obtained can be varied over a wide extent. This is highly advantageous, because the compositions of the present invention do not need to contain any polyol of molecular weight higher than 2000 g/mol, or even higher than 1000 g/mol, such as PPG to soften the foam, such polyols having the drawback of concomitantly, substantially increasing the viscosity of the mixture. Actually, a mixture according to the present invention preferably comprises no PPG.

The addition in the mixture of NCO end-capped prepolymers of TDI as described supra allows to dilute crude MDI which allows to enhance diffusion and therefore contribute to the reactions of free monomeric MDI with —OH groups. Furthermore, since the TDI-prepolymers are end-capped with NCO-groups which are less reactive to —OH than free monomeric MDI, they will little react in the can. When the mixture is dispensed in the ambient and contacts moisture, however, the NCO-groups will react with —OH and contribute to the final cure of the polyurethane polymer. It is important that the NCO end-capped prepolymer of TDI be prepolymerized prior to addition thereof to the mixture, as the structure of TDI prepolymers thus formed in the can from crude TDI and alcohols could not be controlled sufficiently to ensure that the level of free monomeric MDI is maintained low, below 4 wt. %, preferably below 3 wt. %, more preferably below 1 wt. %.

Since one of the objectives of the present invention is to substantially reduce the content of free monomeric MDI remaining unreacted with the alcohols, the raw materials are so dosed as to yield a NCO/OH ratio comprised between 2.6 and 5.0, preferably between 2.6 and 4.0, more preferably between 2.9 and 3.5, which is generally lower than most traditional OCF compositions with NCO/OH ratios higher than 4.8.

Any blowing agent known in the art can be used for mixtures according to the present invention for one component foams, provided it is compatible with the NCO-prepolymers, which is the case of all the traditional blowing agents tested to date. Particularly preferred blowing agents are propane, butane, i-butane, dimethyl ether (DME), carbon dioxide ($CO_2$), and mixtures thereof, and are preferably present in an amount of 50 to 70 vol. %, more preferably 55 to 65 vol. %.

A catalyst is used and any catalyst traditionally used in OCF compositions may be used here. Besides the traditional tin based catalysts (e.g., stannous octoate), excellent results were obtained with Lewis bases or acids, dimethyl aminoethoxyethanol (DMEE), di-morpholino diethyl ether (DMDEE), or mixtures thereof. In most applications, a flame retardant is required, which can be selected from the group of: monochlorinated mono-methyl ester of castor oil, or (1-chlor-2-propyl) phosphate (TCPP). A surfactant and/or cell structure regulator may also be used, such as silicone surfactants or paraffin. Any filler, pigment, or dye may be used and the compositions of the present invention are not restricted thereto.

The compositions of the present invention may be prepared by a process as defined in the appended claims. In particular, the various components may be loaded in a mixer and mixed for a given time of about 20 to 120 min, preferably 30 to 60 min, appropriate amounts of polyisocyanate, mono-functional alcohol, optionally bi-functional alcohol, tri- and higher functional alcohols, a catalyst and other additives as described supra. If several polyisocyanates are used, it may be advantageous to prepare separately prepolymer blends with each type of polyisocyanate with the specific polyols, or specific amounts of polyols, it is desired to react them with. This way, it is possible to better control the composition of the NCO-prepolymers thus prepared.

For example, the polyols, flame retardants, catalyst, and additives can be mixed in a first vessel to form a first mixture (A). Crude MDI may be reacted in a second vessel with a mono-functional alcohol, such as 2-ethyl-hexane to form a prepolymer. Said prepolymer is then admixed with NCO-end capped TDI prepolymer to form a second mixture (B). The two mixtures—(A) polyols and (B) isocyanates—can then be brought together into a can which is closed avoiding contact with moisture. A gas can then be added through a valve to pressurize the can. The polyols in mixture (A) preferably comprise a mixture of tri-functional and/or higher functional alcohols with optionally bi-functional alcohols, such as MEG. Mixtures (A) and (B) are each preferably let to react for 20 to 60 min, preferably 25-45 min, more preferably 30-35 at a temperature of about 10 to 50° C., preferably between 15 and 30° C., more preferably, at room temperature. Throughout the preparation, good mixing of the components should be provided to allow a homogeneous composition to be produced. For example, stirring of the components at rates of 200 to 400 rpm, preferably, 300 to 350 rpm is advantageous.

The final vessel is preferably a pressurized vessel, in particular a spraying can, allowing the prepolymer mixture to be simply sprayed onto the target position, and the composition will react with ambient moisture to form a polyurethane foam as described supra.

In order to further reduce the content of free MDI, a distillation step may be used. It has been discovered that rather than using traditional distillation techniques, best results were obtained using a short path wiped film evaporation technique. Short path evaporation is carried out by letting a film of the liquid to be treated fall down along the inner surface of a cylindrical vertical surface, while the outer surface thereof is being heated. The thickness of the film is controlled by a slow rotating scrapper and the evaporation takes place as a molecular distillation without bubbling to avoid losses by pneumatic transport of droplets. Reduced pressure to below 0.1 bar is assured by a vacuum pump system provided with nitrogen traps. The short path to the condenser is essential to reduce the effective volume of gas, and therefore the pressure drop across the system. Pressure drop below 0.01 Bar is to be assured. With this additional step, contents of free monomeric diphenylmethane diisocyanate (MDI) of substantially less than 1 wt % can be obtained.

EXAMPLES

Examples 1 and 2 are embodiments of OCF compositions according to the present invention yielding less than 1 wt. % free monomeric MDI. The compositions listed in Table 1 were prepared as follows.

(A) Preparation of Component A: load in a closed, hermetic vessel protected from moisture and mix at room temperature for 20 min. the amounts indicated in Table 1 of a mixture comprising:
  (a) A tri-functional alcohol: castor oil;
  (b) A bi-functional alcohol: ethylene glycol (not essential, but preferred in the present invention);
  (c) A catalyst: di-morpholino diethyl ether (DMDEE);
  (d) A flame retardant: TCPP; and a
  (e) Surfactant: silicone surfactant (Tegostab B8870).

(B) Preparation of Component B: load in a closed, hermetic vessel protected from moisture and mix under stirring conditions at a rotation speed of 300 to 350 rpm, at room temperature for 35 min the amounts indicated in Table 1 of a mixture comprising:
  (f) Crude MDI: Suprasec 5025;
  (g) A mono-functional alcohol: 2-ethyl hexanol (preferably add by portions under 300-350 rpm);

After the mixing operation of components (f) and (g) is completed in accordance with the above, add
  (h) the NCO end-capped TDI Prepolymer: OP/Glycol Mw 3000

Mix at least for 60 min, preferably at least 50 min., more preferably at least 45 min.

TABLE 1

OCF compositions according to the present invention

| type | raw materials | Ex 1, % w GGE | Ex2, wt. % ADS |
|---|---|---|---|
| (a) Tri-OH | castor oil | 5.6% | 7.5% |
| (b) Bi-OH | ethylene glycol | 0.8% | 1.1% |
| (c) catalyst | DEMEE | 0.3% | 0.3% |
| (d) flame retard. | TCPP | 6.7% | 6.7% |
| (e) surfactant | tegostab B8870 | 2.7% | 2.7% |
| (f) NCO | crude MDI-Suprasec 5025 | 28.8% | 38.8% |
| (g) mono-OH | 2-Ethyl-hexanol | 4.5% | 6.1% |
| (h) TDI pre-polymer | NCO end capped TDI pre-polymer OP/Glycol Mw 3000 | 26.5% | 13.4% |
| (i) blowing agent propane | i-butane | 16.9% | 11.4% |
| | dimethyl ether | 7.2% | 7.0% |
| | propane | 0.0% | 4.9% |
| | total | 100.0% | 100.0% |

Fill the components A and B in cans or vessels sheltered from moisture. Next, without mixing, close the can or vessel provided with a valve and inject theretrhough a blowing agent (i), comprising:
  Gas i-butane;
  Gas dimethyl ether; and
  Gaspropane Then, shake the can for appropriate time, initially 15-20 s., afterward still 2-3 min.

One component foam compositions are thus obtained, yielding a very low amount of free monomeric MDI, as low as less than 1 wt. %, that show excellent storage properties and yield excellent foams by simply spraying their contents at ambient in the desired location.

The invention claimed is:

1. A one component isocyanate prepolymer mixture for the production of a polyurethane product, said one component isocyanate prepolymer mixture having a content of free monomeric diphenylmethane diisocyanate (MDI) of not more than 4 wt. %, with respect to the total weight of the one component isocyanate prepolymer mixture, and being obtained by mixing in the absence of moisture at least:
   (A) an isocyanate component, or mixture of isocyanate components, having a functionality of at least 2.6;
   (B) a tri- or higher functional polyol; and
   (C) a catalyst and optional additives; and wherein said one component isocyanate prepolymer mixture further
      (a) a mono-functional alcohol having a molecular weight of at least about 130 g/mol, and
      (b) an isocyanate end-capped prepolymer of toluene diisocyanate.

2. The one component isocyanate prepolymer mixture according to claim 1, wherein said isocyanate component or mixture of isocyanate components comprises crude diphenyl methane diisocyanate (crude MDI), and optionally any one or more of diphenyl methane diisocyanate (MDI), toluene diisocyanate (TDI), crude toluene diisocyanate (crude TDI), poly-phenyl methane poly-isocyanate (PMDI), and any mixture thereof having a functionality of at least 2.6.

3. The one component isocyanate prepolymer mixture according to claim 2, wherein the tri- or higher functional polyol has a molecular weight of not more than 2000, and comprises one or more of
   (i) an ester with three or more esterified hydroxy functional fatty acid groups, wherein the closest hydroxyl group on each hydrocarbon chain is separated from the respective ester group by at least seven carbons; and
   (ii) a hydroxy functional polyether oligomer having an overall hydroxy functionality comprised between 3 and 8.

4. The one component isocyanate prepolymer mixture according to claim 3, wherein the tri- or higher functional polyol comprises (i) the ester with three or more esterified hydroxy functional fatty acid groups and wherein the three or more esterified hydroxy functional fatty acid groups are selected from the group consisting of ricinoleic acid, avenoleic acid, strophantus acid, lesquerolic acid, 14-hydroxy-11-eicosenoic acid, densipolic acid, and auricolic acid.

5. The one component isocyanate prepolymer mixture according to claim 4, further comprising a bi-functional alcohol having a molecular weight not greater than about 110 g/mol, wherein said bi-functional alcohol is a member selected from the group consisting of monoethylene glycol (MEG), diethylene glycol (DEG), propylene glycol, 1,3-propylene glycol, 1,3-butane diol, 1,4-butane diol, neopentyl glycol, and mixtures thereof.

6. The one component isocyanate prepolymer mixture according to claim 5, wherein the content of free monomeric MDI is not more than 3 wt. % with respect to the total weight of the one component isocyanate prepolymer mixture.

7. The one component isocyanate prepolymer mixture according to claim 1 for the preparation of a polyurethane foam, further comprising a blowing agent, which is a member selected from the group consisting of propane, butane, i-butane, dimethyl ether (DME), carbon dioxide ($CO_2$), and mixtures thereof.

8. The one component isocyanate prepolymer mixture according to claim 1, comprising one or more additives selected from the group consisting of monochlorinated mono-methyl ester of castor oil, (1-choro-2-proply) phosphate, a Lewis base catalyst, a Lewis acid catalyst, dimethyl aminoethoxyethanol, di-morpholino diethyl ether, a surfactant, a cell structure regulator, a filler, pigment, and a dye.

9. The one component isocyanate prepolymer mixture according to claim 1, wherein the molar ratio, NCO/OH, of isocyanate to hydroxyl groups in the one component isocyanate prepolymer mixture is between 2.6 and 5.0.

10. The one component isocyanate prepolymer mixture according to claim 1, comprising:
    between 15 and 25 wt. % of diphenyl methane diisocyanate (MDI) or poly-phenyl methane poly-isocyanate (PMDI) prepolymers as the isocyanate component, or mixture of isocyanate components, having a functionality of at least 2.6,
    between 20 and 75 wt. %, of isocyanate end-capped TDI;
    between 5 and 15 wt. % of the mono-functional alcohol;
    between 0 and 15 wt. % of a bi-functional alcohol;
    between 8 and 20 wt. % of castor oil;
    all weight fractions being calculated with respect to the total weight of the one component isocyanate prepolymer mixture.

11. A method for preparing a one component isocyanate prepolymer mixture for the production of polyurethane, said one component isocyanate prepolymer mixture having a content of free monomeric diphenylmethane diisocyanate (MDI) of not more than 4 wt. % with respect to the total weight of the one component isocyanate prepolymer mixture, said method comprising preparing in a closed, hermetic vessel protected from moisture a one component isocyanate prepolymer mixture comprising:
    (a) an isocyanate component, or mixture of components, having a functionality of at least 2.6;
    (b) a tri- or higher functional polyol;
    (c) a catalyst and additives;
    (d) an isocyanate end-capped prepolymer of toluene diisocyanate (TDI); and
    (e) a mono-functional alcohol having a molecular weight of at least about 130 g/mol.

12. The method according to claim 11, further comprising the following steps:
    (a) stabilizing the one component isocyanate prepolymer mixture in a short path wiped film evaporator to form a stabilized mixture, and
    (b) reducing the amount of free monomeric MDI by distillation of the stabilized mixture.

13. The method according to claim 11 for preparing a one component polyurethane foam precursor comprising the additional steps:
    optionally transferring the one component isocyanate prepolymer mixture a dispensing container, while shielding the one component isocyanate prepolymer mixture from moisture; and
    hermetically closing the vessel or dispensing container containing the one component isocyanate prepolymer mixture and introducing therein a blowing agent under pressure through a valve.

14. The one component isocyanate prepolymer mixture according to claim 1, wherein the tri- or higher functional polyol has a molecular weight of not more than 2000, and comprises one or more of (i) an ester with three or more esterified hydroxy functional fatty acid groups, wherein the closest hydroxyl group on each hydrocarbon chain is separated from the respective ester group by at least seven carbons; and (ii) a hydroxy functional polyether oligomer having an overall hydroxy functionality comprised between 3 and 8.

15. The one component isocyanate prepolymer mixture according to claim 14, wherein the tri-or higher functional polyol comprises (i) the ester with three or more esterified hydroxy functional fatty acid groups and wherein the three or more esterified hydroxy functional fatty acid groups are selected from the group consisting of ricinoleic acid, avenoleic acid, strophantus acid, lesquerolic acid, 14-hydroxy-11-eicosenoic acid, densipolic acid, and auricolic acid.

16. The one component isocyanate prepolymer mixture according to claim 1, further comprising a bi-functional alcohol having a molecular weight not greater than about 110 g/mol, wherein said bi-functional alcohol is a member selected from the group consisting of monoethylene glycol (MEG), diethylene glycol (DEG), propylene glycol, 1,3-propylene glycol, 1,3-butane diol, 1,4-butane diol, neopentyl glycol, and mixtures thereof.

17. The one component isocyanate prepolymer mixture according to claim 1, wherein the content of free monomeric MDI is not more than 3 wt. % with respect to the total weight of the one component isocyanate prepolymer mixture.

\* \* \* \* \*